(12) United States Patent
Felker

(10) Patent No.: US 11,213,008 B2
(45) Date of Patent: Jan. 4, 2022

(54) PET FEEDING BOWL ASSEMBLY

(71) Applicant: Jenny Felker, Ellaville, GA (US)

(72) Inventor: Jenny Felker, Ellaville, GA (US)

( * ) Notice: Subject to any disclaimer, the term of this patent is extended or adjusted under 35 U.S.C. 154(b) by 177 days.

(21) Appl. No.: 16/781,690

(22) Filed: Feb. 4, 2020

(65) Prior Publication Data
US 2021/0235663 A1 Aug. 5, 2021

(51) Int. Cl.
*A01K 5/01* (2006.01)
*A01M 29/34* (2011.01)

(52) U.S. Cl.
CPC .............. *A01K 5/0142* (2013.01); *A01K 5/01* (2013.01); *A01M 29/34* (2013.01)

(58) Field of Classification Search
CPC .................................................... A01K 5/0142
See application file for complete search history.

(56) References Cited

U.S. PATENT DOCUMENTS

| 2,677,350 | A | 5/1954 | Prestidge |
| 4,803,954 | A | 2/1989 | Welch |
| 5,031,575 | A | 7/1991 | Phillips |
| 5,069,166 | A | 12/1991 | Ahuna |
| 5,113,798 | A | 5/1992 | Rera |
| 5,647,299 | A * | 7/1997 | Pearson-Falcon ... A01K 5/0142 119/61.53 |
| 6,520,114 | B1 * | 2/2003 | Chun .................... A01K 5/0135 119/61.54 |
| 6,860,229 | B1 * | 3/2005 | Craft .................... A01K 5/0142 119/61.5 |
| D523,185 | S * | 6/2006 | Oliphant .............. A01K 5/0142 D30/129 |
| 2009/0229528 | A1 * | 9/2009 | McMurtry ........... A01K 5/0142 119/61.53 |
| 2010/0170447 | A1 * | 7/2010 | Pridgen, Jr. .......... A01K 5/0128 119/61.53 |
| 2012/0210941 | A1 * | 8/2012 | Brown .................. A01K 5/0114 119/61.52 |
| 2016/0219832 | A1 * | 8/2016 | Langston ............. A01K 5/0142 |

* cited by examiner

*Primary Examiner* — Jessica B Wong

(57) ABSTRACT

A pet feeding bowl assembly for inhibiting insects from accessing animal feed includes disk that is positionable on a support surface. A bowl is coupled to and extends upwardly from the disk and animal feed can be positioned in the bowl. The bowl is centrally positioned on the disk such that the disk defines a moat surrounding the bowl. In this way the moat inhibit insects from accessing the bowl when the moat is filled with a fluid. A spout is integrated into the bowl and the spout is directed toward the moat defined by the bowl and the disk. In this way the fluid can be poured into the spout for filling the moat.

7 Claims, 4 Drawing Sheets

PET FEEDING BOWL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to feeding bowl devices and more particularly pertains to a new feeding bowl device for inhibiting insects from accessing animal feed.

(2) Description of Related Art Including Information Disclosed Under 37 CFR 1.97 and 1.98

The prior art relates to feeding bowl devices. The prior art discloses a feeding dish which includes a trough for containing a fluid insecticide. Additionally, the prior art discloses a feeding dish said removably engages and sits inside a larger dish to define a space between the feeding dish and the larger dish for capturing insects. The prior art also discloses a feeding dish and a surround that receives the feeding dish; the surround has a channel therein for capturing insects attempting to enter the feeding dish. The prior art discloses a feeding dish and a pan that receives the feeding dish to define a moat extending around the feeding dish.

BRIEF SUMMARY OF THE INVENTION

An embodiment of the disclosure meets the needs presented above by generally comprising a disk that is positionable on a support surface. A bowl is coupled to and extends upwardly from the disk and animal feed can be positioned in the bowl. The bowl is centrally positioned on the disk such that the disk defines a moat surrounding the bowl. In this way the moat inhibit insects from accessing the bowl when the moat is filled with a fluid. A spout is integrated into the bowl and the spout is directed toward the moat defined by the bowl and the disk. In this way the fluid can be poured into the spout for filling the moat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
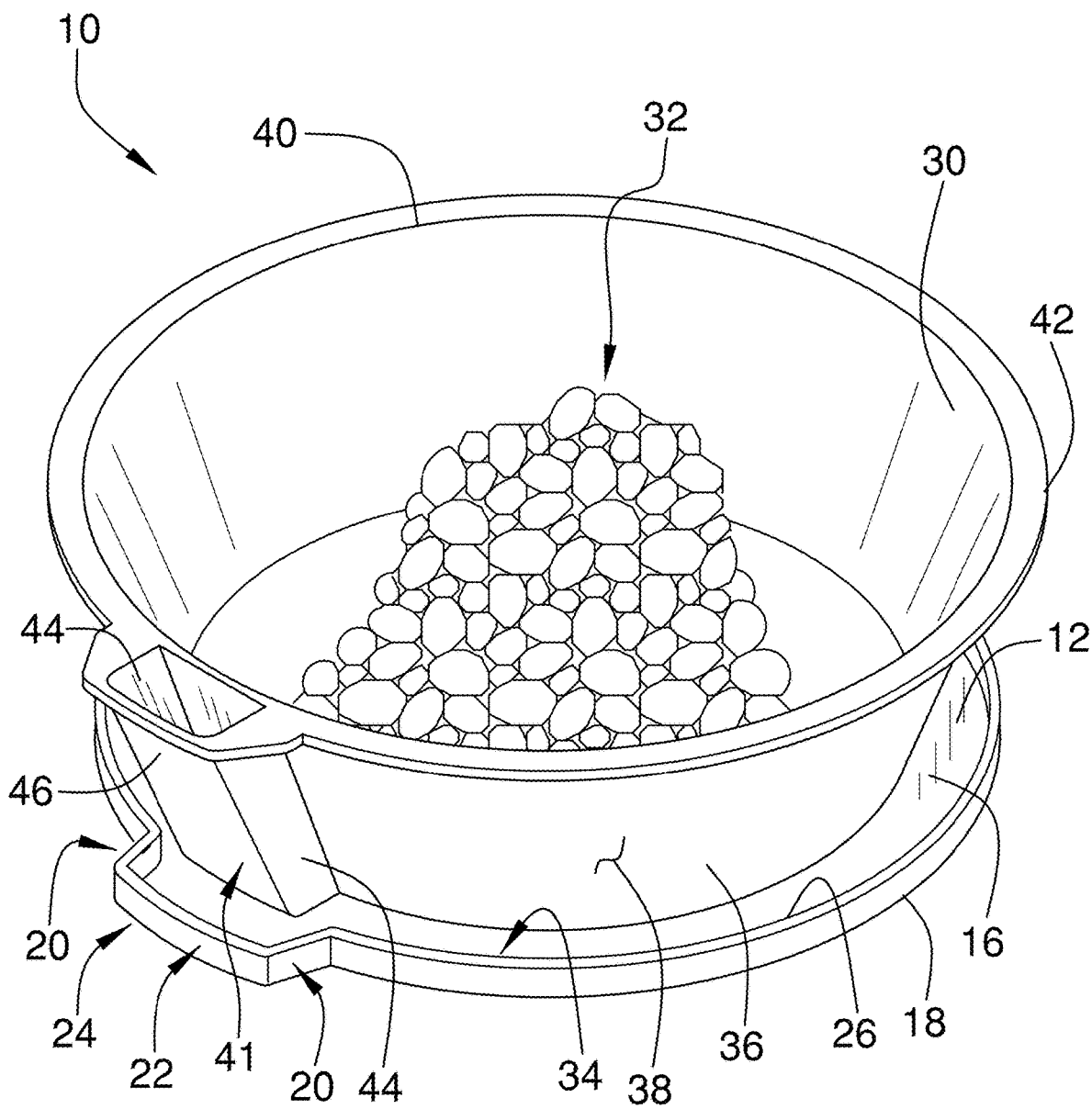
FIG. 1 is a perspective view of a pet feeding bowl assembly according to an embodiment of the disclosure.
Figure 2:
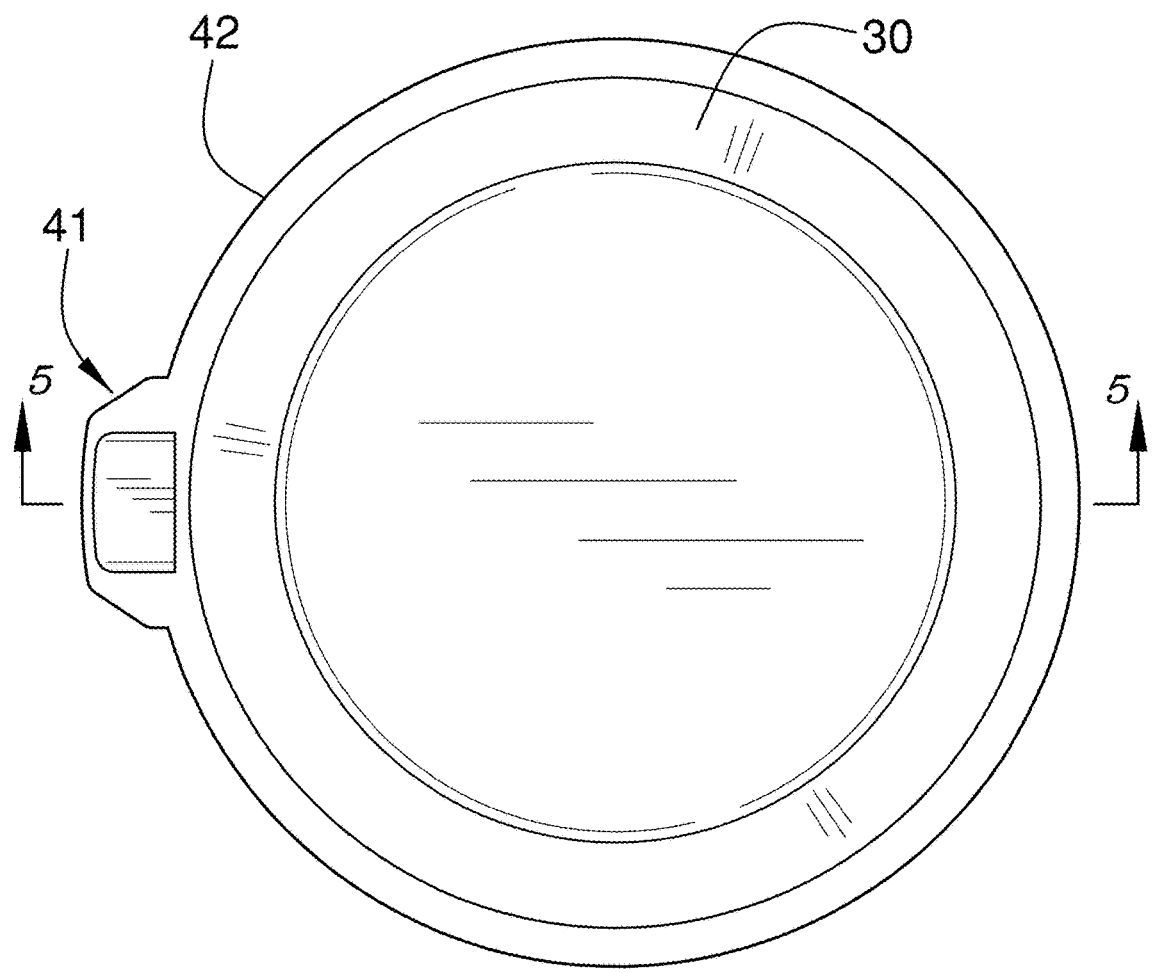
FIG. 2 is a top view of an embodiment of the disclosure.
Figure 3:
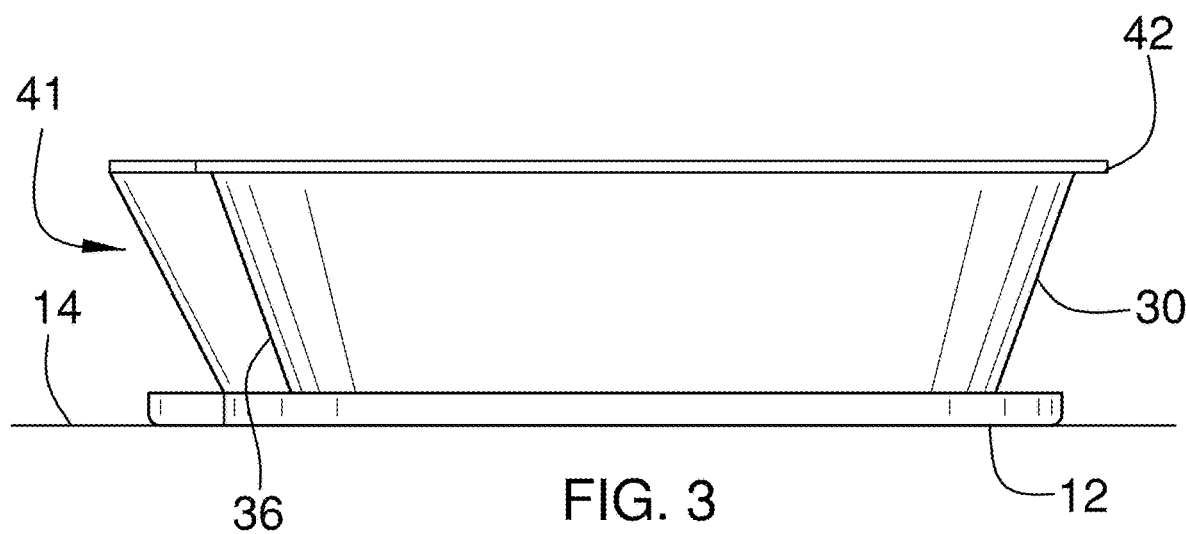
FIG. 3 is a front view of an embodiment of the disclosure.
Figure 4:
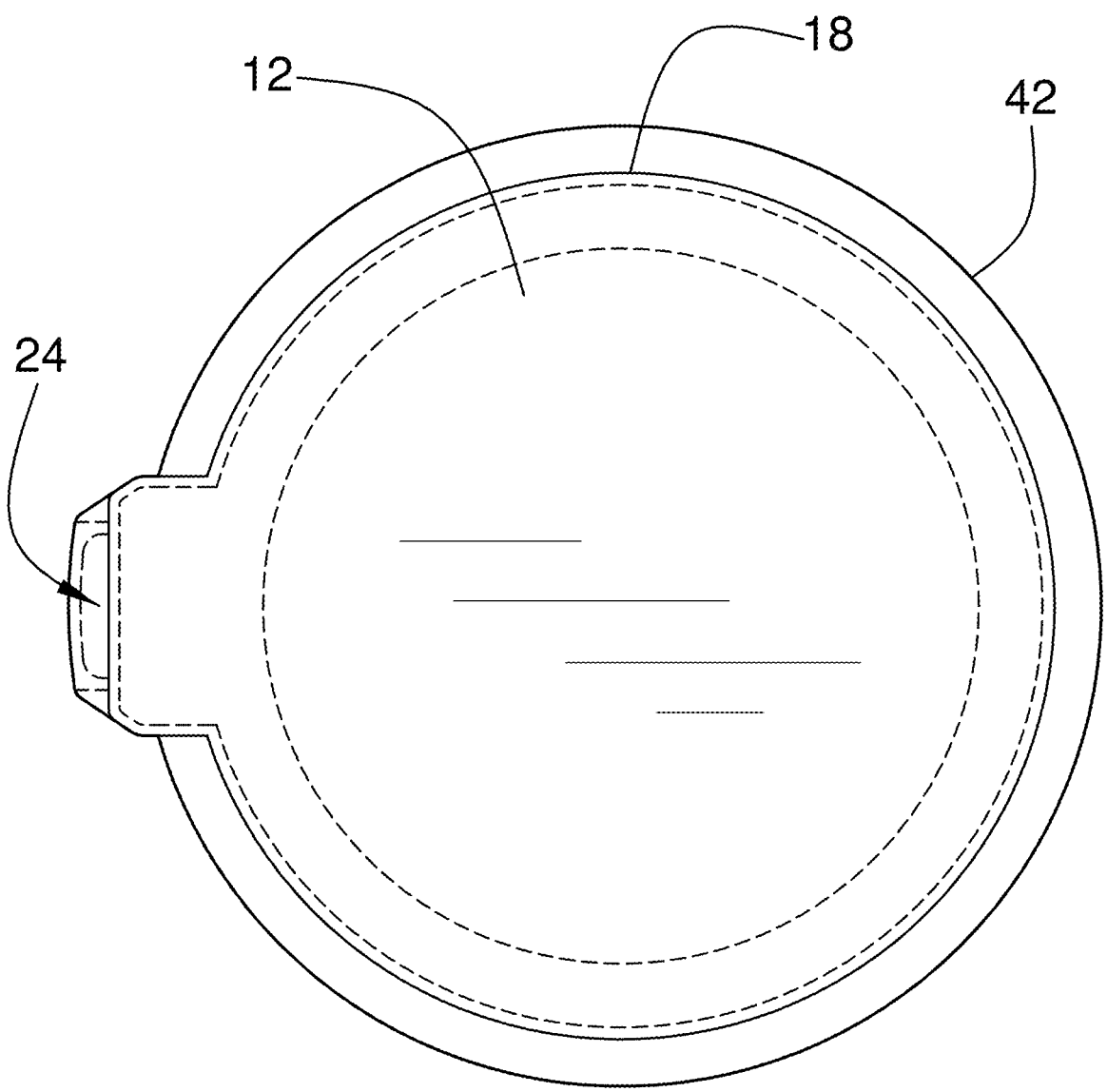
FIG. 4 is a bottom phantom view of an embodiment of the disclosure.
Figure 5:
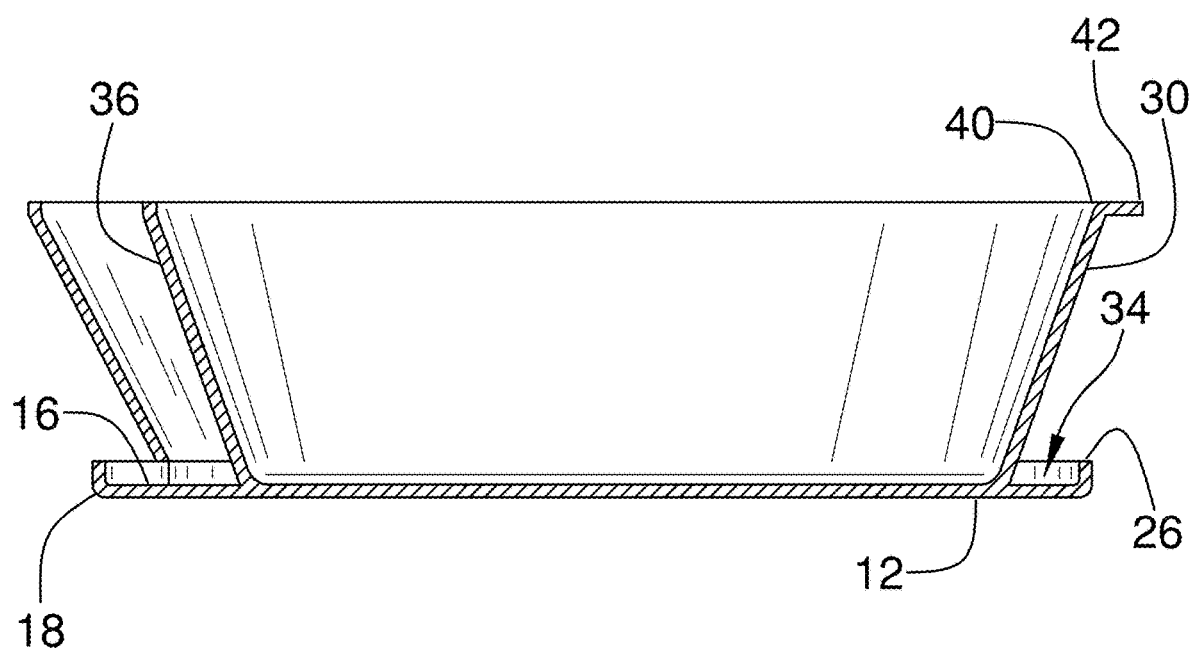
FIG. 5 is a cross sectional view taken along line 5-5 of FIG. 2 of an embodiment of the disclosure.

With reference now to the drawings, and in particular to FIGS. 1 through 5 thereof, a new feeding bowl device embodying the principles and concepts of an embodiment of the disclosure and generally designated by the reference numeral 10 will be described.

As best illustrated in FIGS. 1 through 5, the pet feeding bowl assembly 10 generally comprises a disk 12 that is positionable on a support surface 14, and the disk 12 has a top side 16 and a perimeter edge 18. The perimeter edge 18 includes a pair of first portions 20 extending laterally away from the perimeter edge 18 and a second portion 22 extending between the first portions 20 to define a peninsula 24 on the disk 12. The top side 16 has a lip 26 extending upwardly therefrom and the lip 26 is coextensive with the perimeter edge 18. In this way the disk 12 can contain a fluid that is poured thereon. The fluid may be water or other fluid that is non toxic to animals.

A bowl 30 is coupled to and extends upwardly from the disk 12 and animal feed 32 can be positioned in the bowl 30. The animal feed 32 may be dry cat food, dry dog food or other type of animal food for feeding cats, dogs or other domesticated or semi-domesticated animals. The bowl 30 is centrally positioned on the disk 12 such that the disk 12 defines a moat 34 surrounding the bowl 30. The moat 34 inhibits insects from accessing the bowl 30 when the moat 34 is filled with a fluid. In this way the animal feed 32 is kept free from the insects thereby facilitating an animal to eat the animal feed 32. The bowl 30 has an outer wall 36 extending upwardly from the top side 16 of the disk 12; the outer wall 36 has an outside surface 38 and a distal edge 40 with respect to the disk 12. The outside surface 38 has a ledge 42 extending outwardly therefrom and the ledge 42 is coextensive with the distal edge 40.

A spout 41 is integrated into the bowl 30 and the spout 41 is directed toward the moat 34 defined by the bowl 30 and the disk 12. In this way the fluid can be poured in the spout 41 for filling the moat 34. The spout 41 is positioned on the outside surface 38 of the outer wall 36 of the bowl 30 and the spout 41 is aligned with the peninsula 24 on the disk 12. The spout 41 extends from the distal edge 40 of the outer wall 36 to a point that is spaced from the top side 16 of the disk 12. The spout 41 may comprise a pair of lateral walls 44 each extending away from the outer wall 36 and a forward wall 46 extending between the lateral walls 44. Additionally, the ledge 42 on the outside surface 38 of the outer wall 36 may extend around a perimeter of the spout 41.

In use, the fluid is poured into the spout 41 to fill the moat 34 with the fluid. In this way any insects that attempt to climb into the bowl 30 will become trapped in the moat 34. Thus, the animal feed 32 in the bowl 30 remains free from insects thereby facilitating the animal to eat the animal feed 32. Moreover, the bowl 30 can be placed outdoors for feeding feral animals while keeping the animal feed 32 free from insects. The fluid can be poured out and replaced when the moat 34 becomes filled with insects.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet feeding bowl assembly having a moat being integrated therein wherein said assembly is configured to inhibit insects from contaminating food contained therein, said assembly comprising:
   a disk being positionable on a support surface;
   a bowl being coupled to and extending upwardly from said disk wherein said bowl is configured to have animal feed positioned therein, said bowl being centrally positioned on said disk such that said disk defines a moat surrounding said bowl wherein said moat is configured to inhibit insects from accessing said bowl when said moat is filled with a fluid; and
   a spout being integrated into said bowl, said spout being directed toward said moat defined by said bowl and said disk wherein said spout is configured to have a fluid poured therein for filling said moat.

2. The assembly according to claim 1, wherein said disk has a top side and a perimeter edge, said perimeter edge including a pair of first portions extending laterally away from said perimeter edge and a second portion extending between said first portions to define a peninsula on said disk.

3. The assembly according to claim 2, wherein said top side has a lip extending upwardly therefrom, said lip being coextensive with said perimeter edge wherein said disk is configured to have a fluid poured thereon.

4. The assembly according to claim 2, wherein said bowl has an outer wall extending upwardly from said top side of said disk, said outer wall having an outside surface and a distal edge with respect to said disk.

5. The assembly according to claim 4, wherein said outside surface has a ledge extending outwardly therefrom, said ledge being coextensive with said distal edge, said.

6. The assembly according to claim 5, wherein said spout is positioned on said outside surface of said outer wall of said bowl, said spout extending from said distal edge of said outer wall and a point being spaced from said top side of said disk.

7. A pet feeding bowl assembly having a moat being integrated therein wherein said assembly is configured to inhibit insects from contaminating food contained therein, said assembly comprising:
   a disk being positionable on a support surface, said disk having a top side and a perimeter edge, said perimeter edge including a pair of first portions extending laterally away from said perimeter edge and a second portion extending between said first portions to define a peninsula on said disk, said top side having a lip extending upwardly therefrom, said lip being coextensive with said perimeter edge wherein said disk is configured to have a fluid poured thereon;
   a bowl being coupled to and extending upwardly from said disk wherein said bowl is configured to have animal feed positioned therein, said bowl being centrally positioned on said disk such that said disk defines a moat surrounding said bowl wherein said moat is configured to inhibit insects from accessing said bowl when said moat is filled with a fluid, said bowl having an outer wall extending upwardly from said top side of said disk, said outer wall having an outside surface and a distal edge with respect to said disk, said outside surface having a ledge extending outwardly therefrom, said ledge being coextensive with said distal edge; and
   a spout being integrated into said bowl, said spout being directed toward said moat defined by said bowl and said disk wherein said spout is configured to have a fluid poured therein for filling said moat, said spout being positioned on said outside surface of said outer wall of said bowl, said spout extending from said distal edge of said outer wall to a point being spaced from said top side of said disk.

* * * * *